United States Patent [19]

Kawasaki et al.

[11] Patent Number: 4,476,890
[45] Date of Patent: Oct. 16, 1984

[54] PRESSURE CONTROL VALVE

[75] Inventors: Haruhiko Kawasaki, Sagamihara; Keiji Ushiro, Tokyo, both of Japan

[73] Assignee: Kayaba Kogyo Kabushiki Kaisha, Tokyo, Japan

[21] Appl. No.: 387,300

[22] Filed: Jun. 10, 1982

[30] Foreign Application Priority Data

Jun. 12, 1981 [JP] Japan .............................. 56-90535
Jun. 12, 1981 [JP] Japan ........................... 56-86314[U]

[51] Int. Cl.³ .................................................. F16K 17/18
[52] U.S. Cl. ......................... 137/269; 137/493.9; 137/491; 137/492.5
[58] Field of Search ............... 137/493, 493.6, 493.9, 137/492.5, 492, 491, 489, 269

[56] References Cited

U.S. PATENT DOCUMENTS 3,112,763 12/1963 Tennis ........................ 137/493.6 X
4,016,903 4/1977 Akashi ........................... 137/493.9
4,289,160 9/1981 Kawasaki et al. ............... 137/493

Primary Examiner—Alan Cohan
Attorney, Agent, or Firm—Jordan and Hamburg

[57] ABSTRACT

A pressure control valve includes a relief poppet biased by a first spring into contact with a seat and an anti-void poppet biased by a second spring into contact with a seat independently of the relief poppet, so that a sharp response of the valve is ensured for a void control or anti-void function and the interference of the anti-void function with a relief function is prevented. Part of the check poppet which faces a relief passageway is formed with a shoulder to direct an outlet portion of a pilot passageway parallel to the axis of the relief passageway, thereby eliminating high frequency vibration of the pilot poppet or generation of noise due to the interference of pilot and main flows of fluid.

13 Claims, 28 Drawing Figures

PRESSURE CONTROL VALVE

BACKGROUND OF THE INVENTION

The present invention relates to a pressure control valve of the type having a pilot poppet therein.

Relief valves capable of controlling a pressure in a hydraulic fluid circuit to below a predetermined reference value may generally be classified into two types, i.e., one which directly responds to a relationship between the circuit pressure and a preload of a spring, and a second type which has a pilot valve and responds to an amplified pressure differential. The present invention is concerned with the second type of relief valve which permits subtle adjustment of a reference pressure and, therefore, a highly accurate control of the fluid pressure.

Generally, a relief valve of the type described has a relief function and a void control or so-called "anti-void" function. The relief function is such that, when the pressure in a hydraulic fluid circuit exceeds a predetermined reference level, a pressure passageway leading from a cylinder port or the like is communicated to a relief passageway to relieve part of the fluid, thereby controlling the pressure in the pressure passageway to the reference level. The anti-void function, on the other hand, is such that upon lowering of the circuit pressure beyond the reference level due to cavitation in the pressure passageway or the like, the pressure passageway and relief passageway are communicated to each other to suck a sufficient amount of fluid from the relief passageway to the pressure passageway to fill up the resulting void, thus maintaining the pressure in the pressure passageway at the reference level. The relief valve has a back pressure chamber defined by a check poppet received in a housing, a valve body screwed into the housing with its end slidably received in the check poppet, and a relief valve slidable within the check poppet.

Commonly utilizing a fluid pressure in the back pressure chamber, the relief function occurs by suitably controlling the relief poppet while the anti-void function occurs by suitably controlling the check poppet. However, the common use of the pressure in the back pressure chamber causes the two different performances to conflict with each other; improving one of the performances deteriorates the other. Particularly, the response of the valve for the anti-void function is slowed down to rather promote the cavitation.

Another problem heretofore pointed out is that a main flow of fluid led from the pressure passageway to the relief passageway through holes in the check poppet affects a pilot flow directed to the relief passageway through a pilot passageway, in a position of the valve where the former joins the latter. The result is unstable relief actions which constitutes a source of high frequency vibration or noise.

SUMMARY OF THE INVENTION

In accordance with the present invention, a pressure control valve includes a relief poppet biased by a first spring into contact with a seat and an anti-void poppet biased by a second spring into contact with a seat independently of the relief poppet, so that a sharp response of the valve is ensured for the anti-void function and the interference between the relief function and the anti-void function is prevented. Part of the check poppet which faces a relief passageway is formed with a shoulder to direct an outlet portion of a pilot passageway parallel to the axis of the relief passageway, thereby eliminating high frequency vibration of the pilot poppet or generation of noise due to the interference of pilot and main flows of fluid.

It is a first object of the present invention to provide a combination type pressure control valve which has a sharp response to the formation of a void and avoids interference between the relief function and the anti-void function.

It is a second object of the present invention to provide a pressure control valve which prevents vibration of a pilot poppet and the resulting noise by eliminating interference between pilot and main flows of fluid.

It is another object of the present invention to provide a generally improved pressure control valve.

Other objects, together with the foregoing, are attained in the embodiments described in the following description and illustrated in the accompanying drawings.

BRIEF DESCRIPTION OF THE DRAWINGS

FIG. 11b is a section taken along line A—A of FIG. 11a;

FIG. 12b is a section of a waved washer shown in FIG. 12a;

DESCRIPTION OF THE PREFERRED EMBODIMENTS

Figure 1:
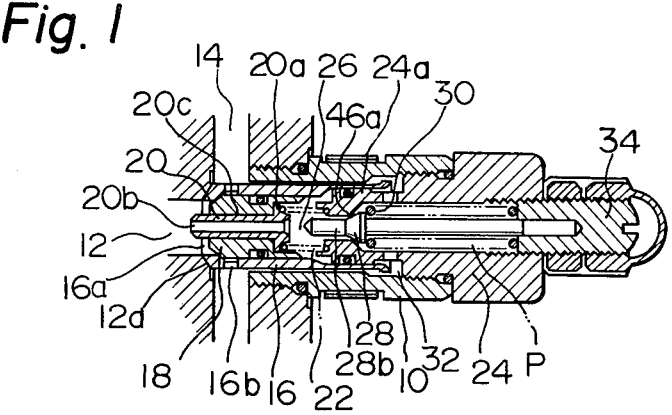
FIG. 1 is a section of a prior art pressure control valve.

While the pressure control valve of the present invention is susceptible of numerous physical embodiments, depending upon the environment and requirements of use, substantial numbers of the herein shown and described embodiments have been made, tested and used, and all have performed in an eminently satisfactory manner.

Referring to FIGS. 1-4, a prior art relief valve of the type to which the present invention is applicable comprises a housing 10. The housing 10 is screwed into a threaded hole formed in a block (not designated) which may be part of a hydraulic control system and is provided with a pressure passageway 12 leading to a high pressure source and a relief passageway 14 leading to a reservoir, although these elements are not shown. The relief valve functions to control the fluid communication between the pressure passageway 12 and the relief passageway 14. For this purpose, the housing has a check poppet 16 thereinside which in turn has a relief poppet 18 slidable thereinside. The relief poppet 18 blocks and unblocks the communication between a pressure port 16a and relief ports 16b formed through the check poppet 16, thereby blocking and unblocking the relief passageway 14. A tubular piston poppet 20 slidably extends through a hole formed in the relief poppet 18. A spring 22 yieldably biases the piston poppet 20 so that an annular flange 20a of the latter abuts against an inner end of the relief poppet 18.

A valve body 24 is screwed into the housing 10 and has an end 24a which is slidable in the check poppet 18 relative to the check poppet 16. These elements define a back pressure chamber 26 for the relief poppet 18. Communicated to the back pressure chamber 26 is a hydraulic fluid under pressure from the pressure passageway 12 which has been restricted by a through bore 20b in the piston poppet 20. When the bore 20 is blocked by the pilot poppet 28, the fluid under pressure is passed through an annular clearance 20c around the piston poppet 20, as will be described later.

The pilot poppet 28 is biased by a spring 30 to have its seat portion 28a held in pressing contact with an end portion 24a of the valve body 24. As the fluid pressure inside the back pressure chamber 26 rises beyond a predetermined level, the pilot poppet 28 is disengaged from the body 24 against the action of the spring 30 to communicate the back pressure chamber 26 to a passageway 32 which leads to the relief passageway 14, whereby the fluid pressure is lowered beyond the predetermined level. The preload of the spring 30 is freely adjustable through a set screw 34.

When the pressure communicated to the back pressure chamber 26 through the piston poppet 20 exceeds the predetermined level, the pilot poppet 28 unseats itself from the body 24 to lower the pressure inside the back pressure chamber 26. The piston poppet 20 is moved by the pressure differential between the pressure passageway 12 and the back pressure chamber 26 against the action of the spring 22, until it abuts against a tip portion 28b of the pilot poppet 28 to block the bore 20b.

Then, the pressure supply to the back pressure chamber 26 is allowed only through the limited clearance 20c around the piston poppet 20 resulting in a further drop of the pressure. The relief poppet 18 is opened by the pressure differential between the back pressure chamber 26 and the pressure passageway 12, so that the passageway 12 is communicated to the relief passageway 14. In this manner, the pressure in the pressure passageway 12 is maintained at the predetermined level.

Apart from the relief function, the pressure control valve has a void control or anti-void function as will be described with reference to FIG. 2. Suppose that the preload of the spring 22 is $F_0$, the diameter of a seat portion 12a of the pressure passageway 12 is $D_0$, the cross-sectional area of the seat portion 10a is $A_0$, the diameter of a larger diameter portion of the back pressure chamber 26 is $D_1$, the cross-sectional area of the larger diameter portion of the back pressure chamber 26 is $A_1$, the pressure within the pressure passageway 12 is $P_H$, the pressure within the relief passageway 14 is $P_L$, the diameter of the bore 20b in the piston poppet 20 is $D_R$, and the cross-sectional area of the bore 20b is $A_R$. Then, at least when the pressure $P_H$ is higher than the pressure $P_L$, there holds a relation $$P_L - P_H < 0$$

Therefore, $$P_L - P_H < F_0/(A_1 - A_0)$$

Figure 2:
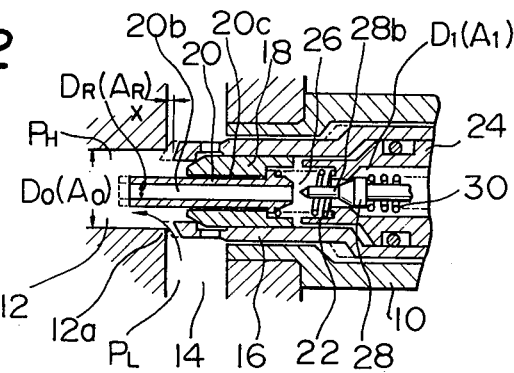
FIG. 2 is a fragmentary section of the valve shown in FIG. 1.
Figure 3:
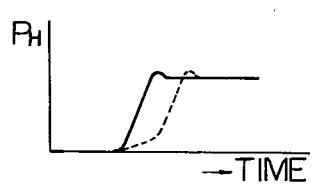
FIGS. 3 and 4 are graphs representing operational characteristics of the valve shown in FIG. 1.
Figure 4:
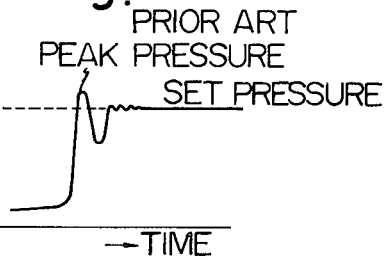

In this situation, the check poppet 16 is kept in pressing contact with the seat portion 12a as indicated by a phantom line in FIG. 2.

When the pressure is lowered due to cavitation in the pressure passageway 12, the relation is inverted as $$P_L - P_H > 0$$

Therefore, $$P_L - P_H > F_0/(A_1 - A_0)$$

This causes the check poppet 16 to move a distance x to a position indicated by a solid line, where it becomes disengaged from the seat portion 12a. Then, a sufficient amount of fluid is sucked from the relief passageway 14 into the pressure passageway 12 as indicated by an arrow to fill up the resulting void.

In order that the check poppet 16 may move the distance x, the fluid in the back pressure chamber 26 must flow out into the pressure passageway 12 via the bore 20b of the piston poppet 20, by a volume expressed as $(A_1 - A_R)x$. If the diameter $D_R$ of the bore 20b is small, the fluid from the back pressure chamber 26 is subjected to restriction and, therefore, to resistance which slows down the opening action of the check poppet 16. Stated another way, the response of the valve is deteriorated at a start of suction due to the damping resistance on the check poppet 16. This promotes the cavitation in the pressure passageway 12. For the same reason, the response of the check poppet 16 for a return stroke at an end of suction is slowed down as indicated by a dashed curve in FIG. 3. Particularly, when the pressure $P_H$ in the pressure passageway 12 has increased during a suction period, the fluid is communicated to the back pressure chamber 26 via the annular clearance between the piston poppet 20 and the relief poppet 18 due to the engagement of the piston poppet 20 with the pilot poppet 28. This delays a return of the check poppet 16 and, thereby, allows the fluid to flow in the direction opposite to that indicated by the arrow 10 resulting in a delay in the elevation of the pressure $P_H$.

An increase in the diameter $D_R$ is undesirable though it may be attempted to eliminate the drawback discussed above. A larger diameter $D_R$ is accompanied by a smaller pressure differential between the back pressure chamber 26 and the pressure passageway 12, which in turn slows down the response of the relief poppet 18. Accordingly, the control to the predetermined pressure noticeably fluctuates before and after the relief poppet 18 begins to open as represented by a curve in FIG. 4, which reaches a peak level higher than the predetermined level and then drops far beyond the predetermined level.

Thus, the same level of pressure inside the back pressure chamber 26 is employed for both the relief function and the anti-void function, the relief poppet 18 being controlled for the relief function and the check poppet 16 for the anti-void function. Such a manner of control degrades one of the relief performance and anti-void performance when it is intended to enhance the other, as previously described.

Referring to FIGS. 5–18, various embodiments of the present invention will be described in which structural elements substantially the same as those of FIG. 1 are denoted by the same reference numerals.

Figure 5A:
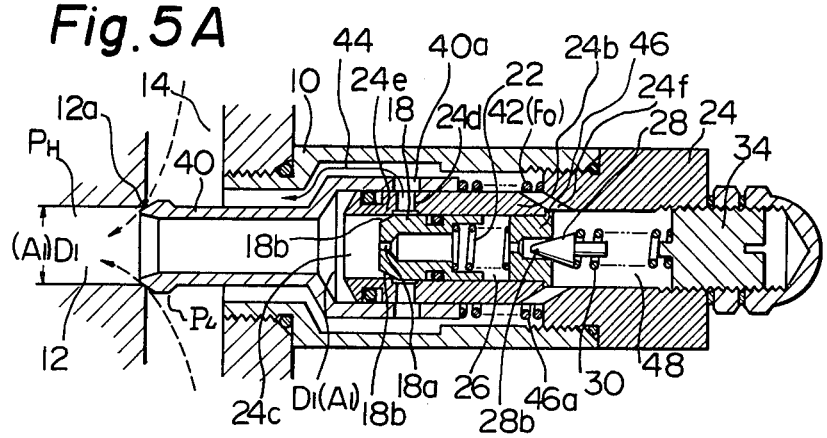
FIG. 5a is a section of a pressure control valve embodying the present invention.

Referring to FIG. 5a, a housing 10 has an anti-void poppet 40 therein which is slidable on a tubular portion 24b of a valve body 24, which is screwed into the housing 10. A spring 42 is loaded between one end of the anti-void poppet 40 and the body 24 to cause the other end of the poppet 40 into contact with a seat portion 12a of a pressure passageway 12. A relief poppet 18 is slidably disposed in the tubular portion 24b of the body 24.

The relief poppet 18 selectively communicates a pressure port 24c and relief ports 24d of the valve body 24 to each other, thereby controlling a relief passageway 14 through holes 40a in the anti-void poppet 40 and an annular passageway 44 which leads to the passageway 14. The relief poppet 18 is formed with an orifice 18a and constantly biased by a spring 22 such that its conical end 18b abuts against a seat portion 24e of the body 24.

A plug 46 is rigidly mounted inside the body 24 to define a back pressure chamber 26 and a pilot chamber 48 at opposite sides thereof. The back pressure chamber 26 is supplied with fluid from the pressure passageway 12 which has been restricted by the orifice 18a. A pilot poppet 28 is located within the pilot chamber 48. The pilot poppet 28 is urged by a spring 30 to have its conical surface engaged with a seat portion 46a of the plug 46. As the pressure inside the back pressure chamber 26 rises to over the preload of the spring 30, the pilot poppet 28 becomes unseated from the plug 46 to set up fluid communication of the back pressure chamber 26 to the annular passageway 44 through passageways 24f, thereby lowering the pressure in the back pressure chamber 26.

When the pressure $P_H$ in the pressure passageway 12 increases beyond a predetermined value, it unseats the pilot poppet 28 from the plug 46 against the force of the spring 30. This, coupled with the restriction by the orifice 18a in the relief poppet 18, greatly lowers the pressure supply into the back pressure chamber 26. Then, the relief poppet 18 is opened due to the difference between the lowered pressure and the pressure $P_H$ in the pressure passageway 12, whereby the fluid is partly relieved via the relief ports 24d and holes 40a as indicated by a solid arrow to keep the pressure in the pressure passageway 12 constant.

When the pressure in the pressured passageway 12 is lowered, there is set up a relation $$P_L - P_H > F_0/(A_1 - A_0)$$

where $D_1$ denotes the diameter of a larger diameter portion of the anti-void poppet 40, $A_1$ its cross-sectional area, and $F_0$ the preload of the spring 42. Under this condition, the anti-void poppet 40 is urged to the right in the drawing overcoming the force of the spring 42, to unblock the seat portion 12a of the pressure passageway 12. This communicates the pressure passageway 12 to the relief passageway 14 so that a sufficient amount of fluid is sucked from the latter into the former as indicated by phantom arrows to fill up the void formed by cavitation.

In this manner, while the relief poppet 18 is controlled for the relief function by the pressure inside the back pressure chamber 26, the anti-void poppet 40 is controlled for the anti-void function by the lower pressure $P_L$ acting on the poppet 40. It will thus be seen that the preload of the spring 30, the spring constant of the spring 22, the diameter and the like of the orifice 18a, the spring constant of the spring 42 and the diameter $D_1$ of the larger diameter portion of the anti-void poppet 40 can be determined independently of each other to attain optimum performances.

Figure 5B:
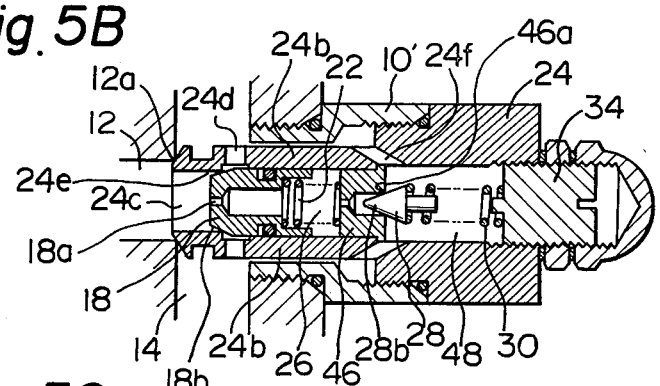
FIG. 5b is a section showing a modified form of the valve shown in FIG. 5a for attaining the relief function only.
Figure 5C:
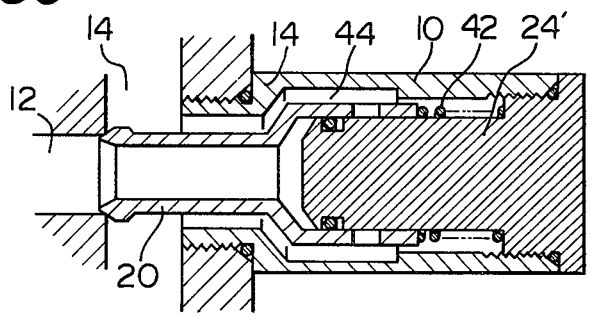
FIG. 5c is a section showing another modified form of the valve of FIG. 5a for attainig the anti-void function only.

The pressure control valve discussed hereabove may be constructed to serve the purpose of relief only or that of anti-void only with addition of a small number of members. In FIG. 5b, the pressure control valve which is designed for the relief function lacks the anti-void poppet 40 and spring 42 and, instead, has an alternative housing 14' having a smaller diameter portion in which the tubular portion 24b of the body 24 is coupled with its end abutting against the seat portion 12a. In FIG. 5c, the pressure control valve which is designed for the anti-void function includes a valve body 24' in the form of a blank plug which is mounted on the housing 14.

Figure 6A:
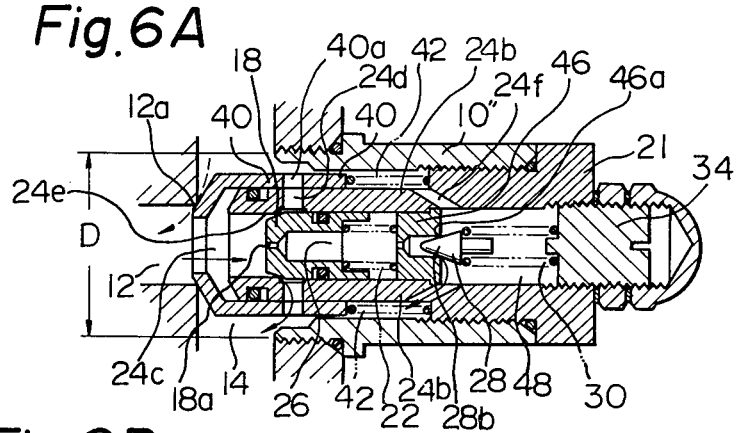
FIG. 6a is a section of a second embodiment of the present invention.
Figure 6B:
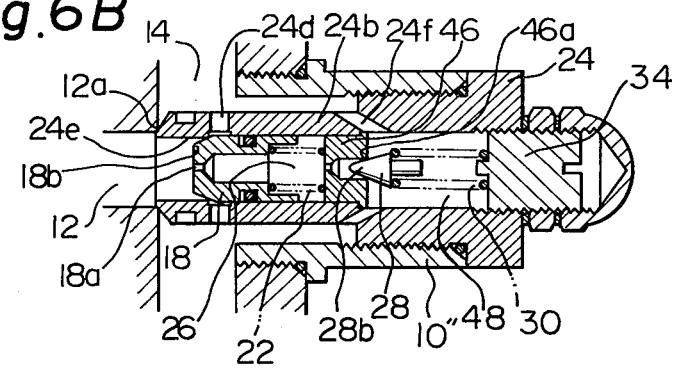
FIG. 6b is a section showing a modification to the valve of FIG. 6a designed for the relief function only.
Figure 6C:
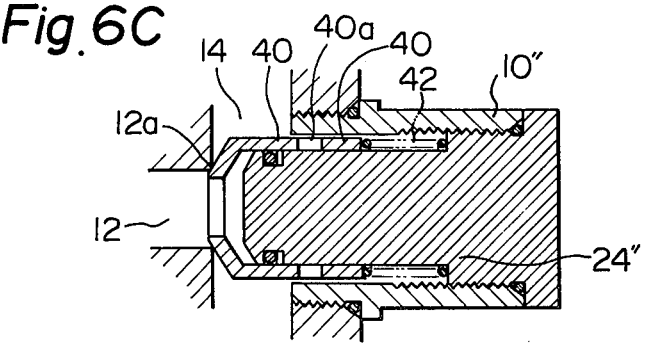
FIG. 6c is a section showing another modification to the valve of FIG. 6a designed for the anti-void function only.

Referring to FIG. 6a, a pressure control valve according to another embodiment of the present invention is shown. The valve has a housing 14" which is mounted to a desired member over an outside diameter D which is larger than that of the valve shown in FIG. 5a. The valve of FIG. 6a may have a design shown in FIG. 6b for the relief function or a design shown in FIG. 6c for the anti-void function, if desired.

Figure 7A:
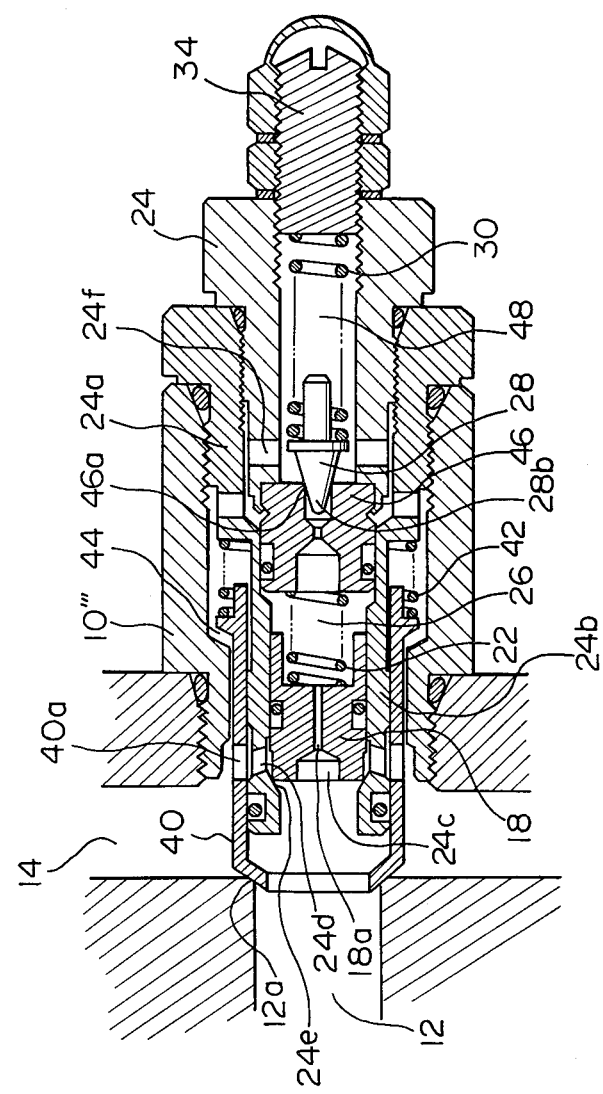
FIG. 7a is a section of a third embodiment of the present invention.
Figure 7B:
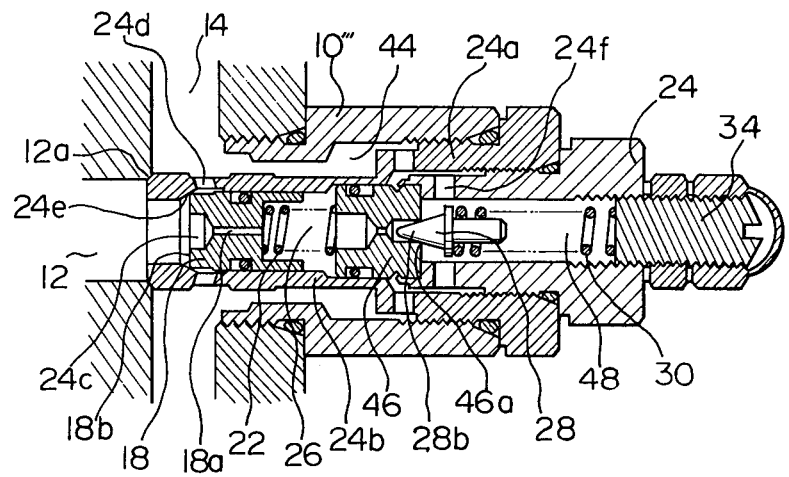
FIG. 7b is a section showing a modification to the valve of FIG. 7a designed for the relief function only.
Figure 7C:
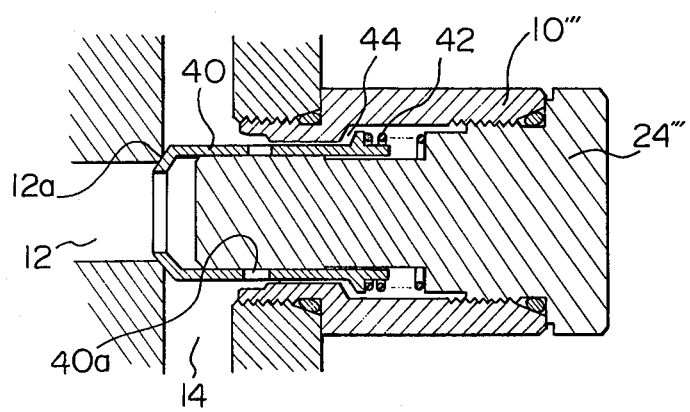
FIG. 7c is a section showing another modification to the valve of FIG. 7a designed for the anti-void function only.

Referring to FIG. 7a, another embodiment of the present invention is illustrated which is similar to the embodiment of FIG. 6a. Differences reside in the configurations of the relief poppet 18, plug 46, tubular portion of the valve body 24, and relief ports 24d in the valve body 24; the relief ports 24d in FIG. 7a are inclined for reasons which will be described later. The valve shown in FIG. 7a may be modified for the relief function as indicated in FIG. 7b or for the anti-void function as indicated in FIG. 7c.

Figure 8:
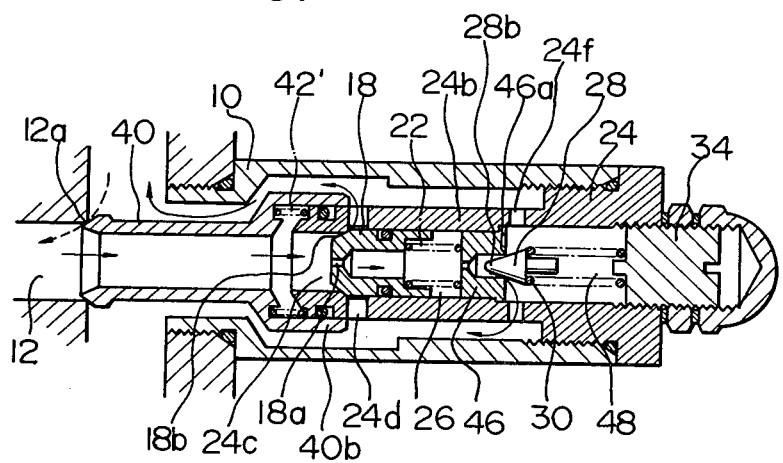
FIG. 8 is a section of a fourth embodiment of the present invention.
Figure 9A:
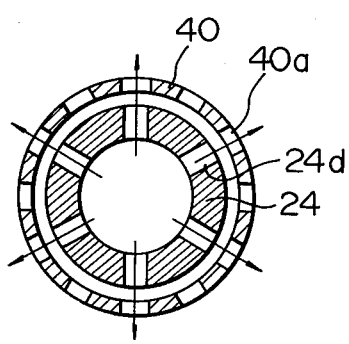
FIGS. 9a and 9b are side elevations indicating different positional relationships between a relief poppet and an anti-void poppet.
Figure 9B:
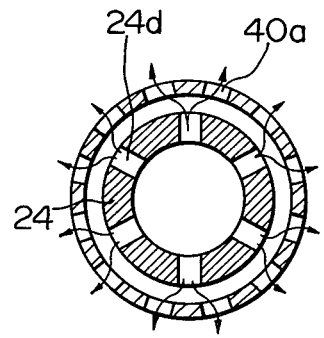
Figure 10:
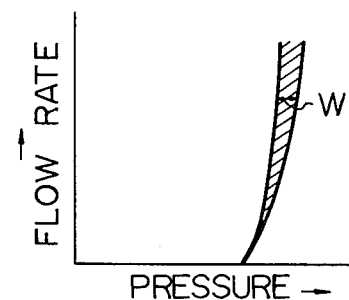
FIG. 10 is a graph representing operational characteristics of the prior art pressure control valve.

Referring to FIG. 8, another embodiment of the present invention is shown which resembles the embodiment of FIG. 5 but differs therefrom in that a spring 42' is loaded between the tip of the tubular portion 24b of the valve body 24 and a larger diameter portion 40b of the anti-void poppet 40, thereby shortening the larger diameter portion 40b and omitting the holes 40a. Generally, relieved fluid flows smoothly as indicated by arrows in FIG. 9a as long as the holes 24d of the body 24 and those 40a of the anti-void poppet 40 remain in alignment. However, once they are misaligned as indicated in FIG. 9b due to a rotation of the anti-void poppet 40, which might result from its slidable position on the valve body 24, the flow of fluid impinges on and is redirected by the inner wall of the anti-void poppet 40 as indicated by arrows. The resulting pressure propagates to the back pressure chamber 26 to affect the balance between the pressure thereinside and the force of the spring 22. Additionally, due to the unfixed positional relationship between the holes 24d and 40a, it cannot have correspondence with the preload of the spring 22 so that the pressure override of the static characteristics varies within a range W shown in FIG. 10, which limits the reliability of operation. Thus, it will be seen that the embodiment shown in FIG. 8 eliminates the cause of the poor reliability by entirely omitting the holes 40a in the anti-void poppet 40, that is, allowing the fluid relieved through the relief ports 24d to smoothly reach the passageway 44.

Figure 11A:
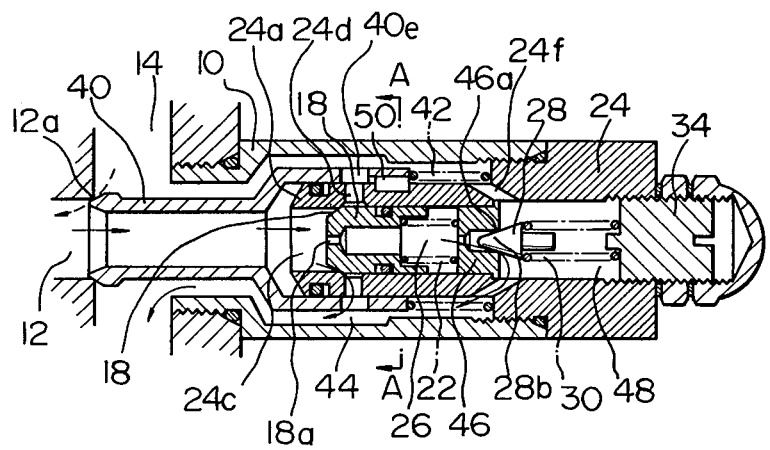
FIG. 11a is a section of a fifth embodiment of the present invention.
Figure 11B:
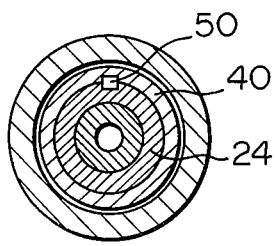

Referring to FIGS. 11a and 11b, another embodiment of the present invention is illustrated which differs from the embodiment of FIG. 5 in that the anti-void poppet 40 and valve body 24 are connected together by a slide key 50 which prevents their relative rotation. This arrangement achieves the same effect as in the embodiment of FIG. 8 because the holes 24d and 40a are fixed in the relative position shown in FIG. 9a.

Figure 12A:
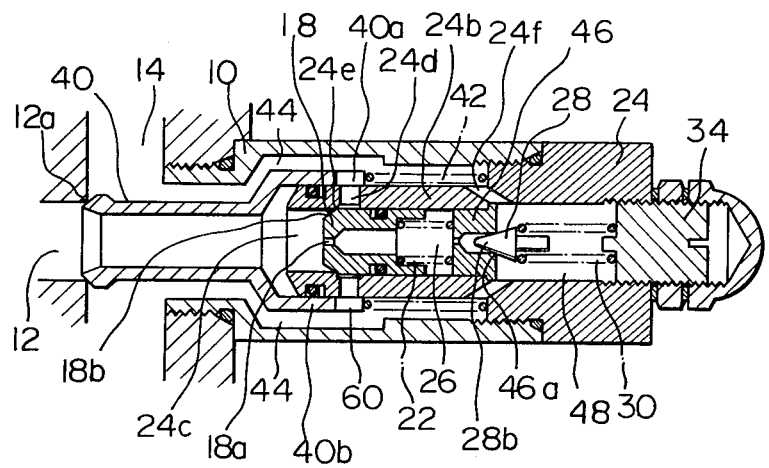
FIG. 12a is a section of a sixth embodiment of the present invention.
Figure 12B:
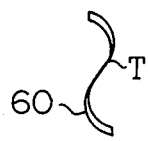
Figure 12C:
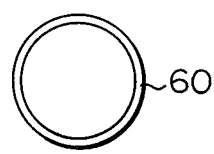
FIG. 12c is a front view of the waved washer.

Referring to FIG. 12a, another embodiment of the present invention is shown which differs from that of FIG. 5 in that the larger diameter portion 40b of the anti-void poppet 40 is shortened to omit the holes 40a, and in that the spring 42 is interposed between the end of the larger diameter portion 40b and the body 24 through a waved washer 60, which spans the holes 24d. As shown in FIGS. 12a and 12b, the waved washer comprises a narrow strip of metal which is waved in the circumferential direction. The metal strip resists the relieved flow of fluid only through its thickness T and, rather, serves to guide the fluid flow. Therefore, the resistance to the fluid flow is only negligible. Thus, this embodiment is comparable with the embodiment of FIG. 8 concerning the achievable effect.

As described above, each of the embodiments shown in FIGS. 5a-12c employs a first spring for urging the relief poppet and a second spring for urging the anti-void poppet. The relief poppet and anti-void poppet can thus be controlled independently of each other so that the response of the valve for the anti-void function is made sharper while the conflict between the relief performance and the anti-void performance is settled. Furthermore, addition of a few members makes the valve operable for the relief function only or for the anti-void function only as desired.

Now, in the prior art relief valve shown in FIG. 1, the main flow of fluid directed from the pressure passageway 12 to the relief passageway 14 via the relief ports 16b adversely affects the pilot flow of fluid directed to the relief passageway 14 via the passageway 32 to join the main flow. That is, the relief actions fall into instability to create a source of high frequency vibration or noise. In detail, in a pressure control valve of the type which remains stable for the relief function, the pressure acting on the pilot poppet 28 is balanced with the force of the spring 30 to keep the pilot poppet 28 unseated from the seat portion 28a. Hence, upon change of the back pressure P acting on the pilot poppet 28, the balance is destroyed resulting in the vibration of the pilot poppet 28.

Figure 13:
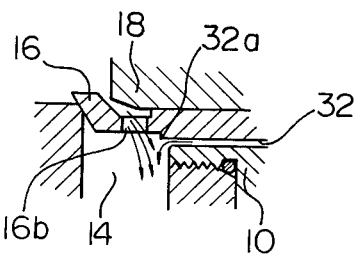
FIG. 13 is a fragmentary section of the valve indicated in FIG. 1.

Meanwhile, when the main fluid flow impinges on the pilot fluid flow or generates a swirl in the vicinity of the outlet 32a of the passageway 32, as indicated by arrows in FIG. 13, it causes a change in the pressure of the pilot fluid flow. This results a change of the back pressure P which in turn causes the pilot poppet 28 into vibration.

Other embodiments of the present invention will be described hereunder which are designed to overcome the drawback stated above.

Figure 14:
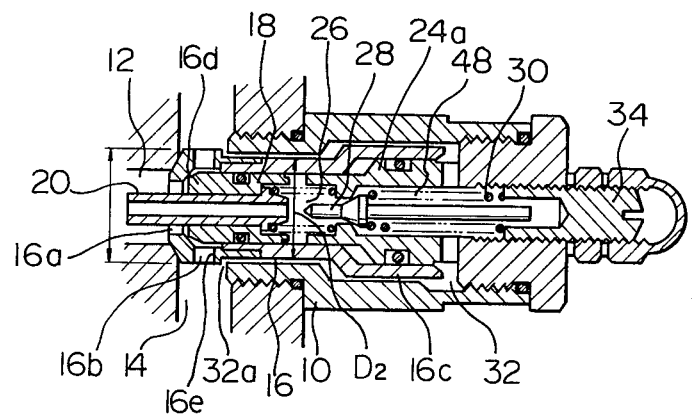
FIG. 14 is a section of a seventh embodiment of the present invention.
Figure 15:
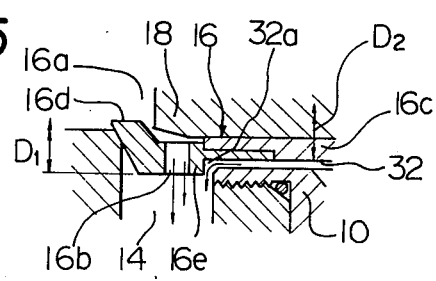
FIG. 15 is a fragmentary section of the valve shown in FIG. 14.

Referring to FIGS. 14 and 15, a check poppet 16 comprises a base portion 16c and an end portion 16c integral with the base portion 16c. The end portion 16d has a head section having a larger diameter $D_1$ and a tubular section having a smaller diameter $D_2$, which connect to each other through a shoulder 16e. The shoulder 16e directs the outlet 32a of the passageway 32 parallel to the axis of the relief passageway 14.

In operation, the pilot flow passed through the passageway 32 is redirected by the shoulder 16e of the check poppet 16 to follow a path parallel to the axis of the relief passageway 12, as indicated by an arrow. The main flow is guided over a length larger than the pilot flow by the length of the shoulder 16e while passing through the holes 16b of the check poppet 16, and it is directed along the axis of the relief passageway 14 as indicated by arrows while being isolated from the outlet 32a. Stated another way, the pilot and main flows follow substantially parallel paths which prevents the pilot flow from being affected by the main flow. This hardly allows the pressure of the pilot flow to undergo a change, stabilizes the back pressure P on the pilot poppet 28 and thereby avoids generation of high frequency vibration or noise.

Figure 16:
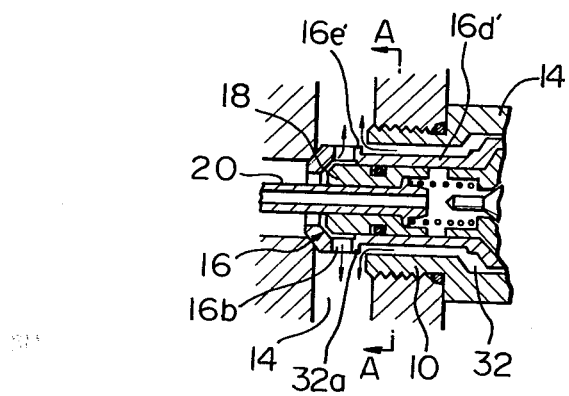
FIG. 16 is a fragmentary section of an eighth embodiment of the present invention.
Figure 17:
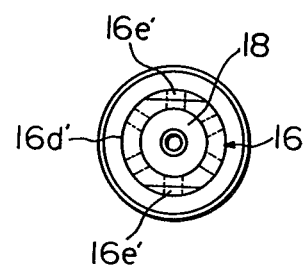
FIG. 17 is a section taken along line A—A of FIG. 16.

FIGS. 16 and 17 indicate another embodiment which is similar to but different from the embodiment of FIG. 14 in that the check poppet 16 has a tubular section 16d' which is flattened at diametrically opposite portions to define the passageway 32. Shoulders 16e' individually delimiting the flat surfaces on the check poppet 16 direct the outlet 32a of the passageway 32 parallel to the axis of the relief passageway 14. This type of arrangement will promote easier machining of the check poppet 16.

Figure 18:
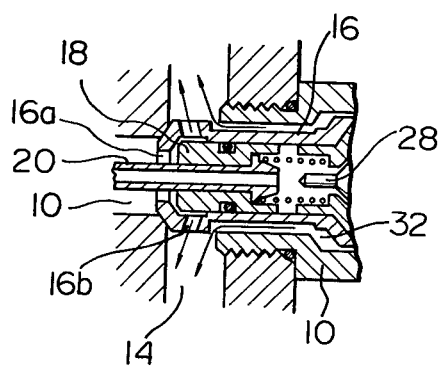
FIG. 18 is a fragmentary section of a ninth embodiment of the present invention.

FIG. 18 shows still another embodiment which differs from the embodiment of FIG. 14 in that the holes 16b in the check poppet 16 are inclined away from each other toward the tip of the check poppet 16 relative to the axis of the check poppet 16. Such a configuration will guide the main flow away from the pilot flow as indicated by arrows, to thereby further suppress the influence of the main flow on the pilot flow. This stabilizes the back pressure P on the pilot poppet 28 and reduces the pressure override so that a flow rate range allowed for the pressure control valve is enlarged.

It will be seen that each of the embodiments discussed above with reference to FIGS. 14-18 prevents the main flow from interfering with the pilot flow by virtue of the shoulder or shoulders on the check poppet which face the relief passageway to direct the outlet of the pilot passageway parallel to the axis of the relief passageway. This stabilizes the back pressure acting on the pilot poppet to thereby eliminate high frequency vibration of the pilot poppet and, accordingly, generation of noise.

Various modifications will become possible for those skilled in the art after receiving the teachings of the present disclosure without departing from the scope thereof.

What is claimed is:

1. A pressure control valve comprising, in combination:

a housing defining a pressure port and a relief port;
   a valve body fixedly accommodated in the housing;
   a relief poppet biased to block communication between the pressure port and the relief port, the relief poppet and the valve body defining a part of a back pressure chamber, a first end of the relief poppet communicating with the pressure port and a second end of the relief poppet communicating with the back pressure chamber;
   a plug defining a pilot poppet chamber on one side and the other part of the back pressure chamber on the other side;
   a pilot poppet accommodated in the pilot poppet chamber and biased to block communication between the back pressure chamber and the relief port, the pilot poppet being moved when a pressure in the back pressure chamber is above a biasing force to unblock communication between the back pressure chamber and the relief port;
   an anti-void poppet having the valve body slidable therein, the valve body being formed with a port for communicating the pressure port with the relief port through the anti-void poppet, the anti-void poppet being biased to unblock communication between the pressure port and the relief port when the pressure in the presence port is below a predetermined value;
   a relief spring for blocking communication between the pressure port and the relief port;
   an anti-void spring for unblocking communication between the pressure port and the relief port when the pressure in the pressure port is below the predetermined value; and
   a waved washer neighboring the port of the valve body to guide the flow of fluid through the port, the anti-void spring being disposed between the wave-washer and the valve body.

2. A pressure control valve as claimed in claim 1, in which the valve body comprises a small-diameter hollow cylindrical portion defining the back pressure chamber and a large-diameter hollow cylindrical portion defining the pilot poppet chamber.

3. A pressure control valve as claimed in claim 2, the anti-void spring is disposed between the anti-void poppet and the large-diameter cylindrical portion of the valve body.

4. A pressure control valve as claimed in claim 2, in which the anti-void spring is disposed between the anti-void poppet and the small-diameter cylindrical portion of the valve body.

5. A pressure control valve as claimed in claim 2, further comprising a pilot spring for blocking communication between the back pressure chamber and the relief port.

6. A pressure control valve as claimed in claim 5, further comprising an adjust means for adjusting a biasing force of the pilot spring.

7. A pressure control valve as claimed in claim 1, in which the valve body comprises a first valve body having a small-diameter hollow cylindrical portion defining the back pressure chamber and a large-diameter hollow cylindrical portion, and a second valve body defining the pilot poppet chamber and being accommodated in the large-diameter cylindrical portion of the first valve body.

8. A pressure control valve as claimed in claim 7, in which the anti-void spring is disposed between the anti-void poppet and the large-diameter cylindrical portion of the second valve body.

9. A pressure control valve as claimed in claim 7, further comprising a pilot spring for blocking communication between the back pressure chamber and the relief port.

10. A pressure control valve as claimed in claim 9, further comprising an adjust means for adjusting a biasing force of the pilot spring.

11. A pressure control valve as claimed in claim 1, further comprising a detent means for preventing relative angular movement between the anti-void poppet and the valve body.

12. A pressure control valve as claimed in claim 1, wherein the housing is formed in two parts, a first one of said housing parts including the pressure port and the relief port, the second of said housing parts including the anti-void poppet and the anti-void spring, the second housing part along with the anti-void poppet and the anti-void spring being removable from the first housing part, and an auxiliary housing which abuts the pressure port when replacing the second housing part, the auxiliary housing performing only a relief function.

13. A pressure control valve as claimed claim 1, wherein the housing is formed in two parts, a first one of said housing parts including said pressure port and said relief port, the second of said housing parts including the relief poppet, the plug, the pilot poppet, and the relief spring, said second housing part along with the relief poppet, the plug, the pilot poppet and the relief spring being removable from the first housing part, and an auxiliary housing accommodated in the anti-void poppet when replacing the second housing part, the auxiliary housing performing only an anti-void function.

* * * * *